April 12, 1927.
P. WINTER
SHEET METAL CUTTER
Filed March 6, 1925
1,624,853
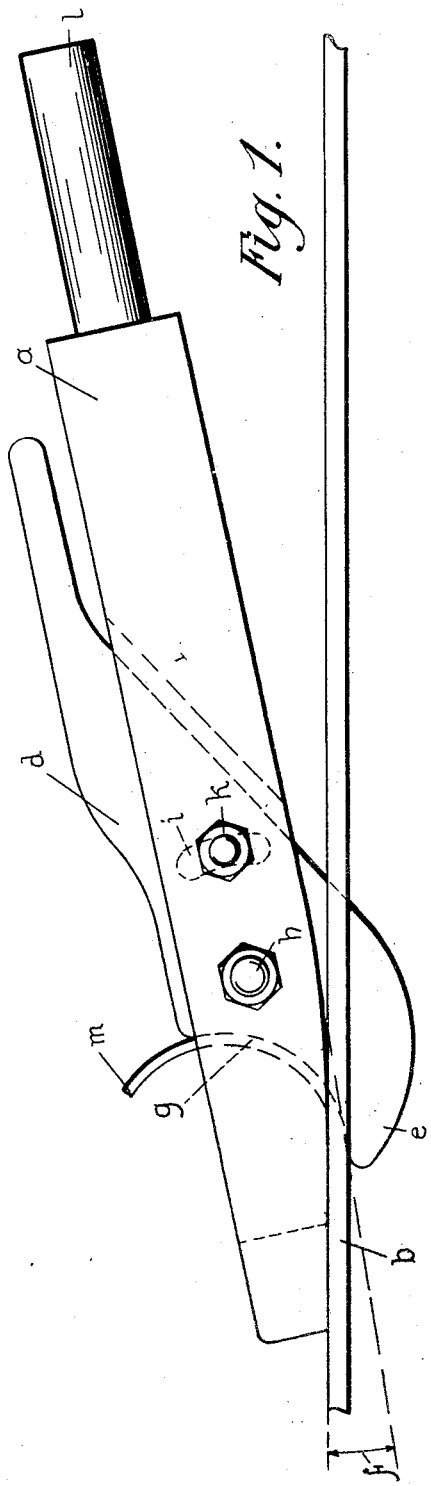
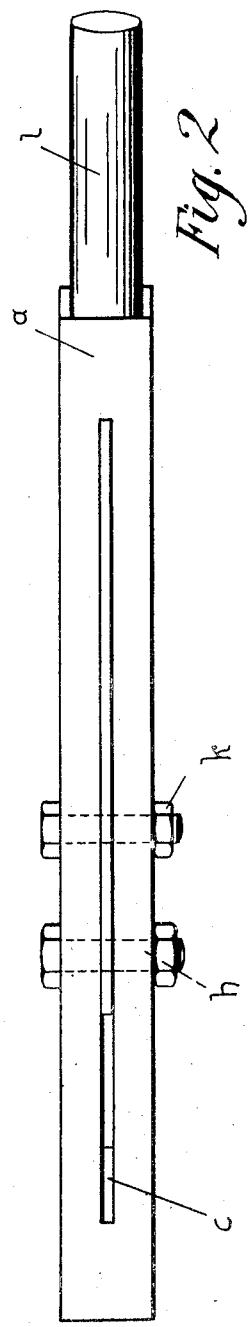
Inventor
Paul Winter Patented Apr. 12, 1927.

1,624,853

UNITED STATES PATENT OFFICE.

PAUL WINTER, OF ZURICH, SWITZERLAND, ASSIGNOR TO ALUMINIUM WELDING WORKS LTD., OF SCHLIEREN, SWITZERLAND.

SHEET-METAL CUTTER.

Application filed March 6, 1925, Serial No. 13,538, and in Switzerland October 23, 1924.

The present invention is a cutter for metal, especially sheet metal. It has a toolholder, the part of which that is to be turned towards the work is provided with a slit. In this a blade is so arranged that its end, which is parallel with the part of the holder where the slit is and projects below it, forms a cutting angle with it. It is so arranged that when the edge of a sheet of metal is introduced into the cutting angle of the tool, the work can be done by striking the holder.

The drawing shows the invention in a form adapted for use with compressed air.

Fig. 1 shows a side view of the tool in working position, and Fig. 2 the view from above.

The tool holder (*a*) has in the part to be turned to the work (*b*) a slit (*c*) in which there is a blade (*d*). The end of the blade (*e*), which projects below the tool holder forms with the holder an acute cutting angle (*f*). The cutting edge (*g*) of the blade is curved, but may also be straight. The blade revolves round the nut (*h*). The cutting angle can be altered by means of the slit (*i*) in the blade, so that it can be adapted to the thickness of the sheet to be cut. The screw (*k*) fixes the blade in the desired position. The shank (*l*) of the holder is cylindrical for insertion in the compressed air tool. It can of course be shaped in any other way, e. g. for hand use of the tool.

If the tool is always to be used for sheet metal of the same thickness as in boilermaking, it is not necessary to make the blade and the cutting angle adjustable.

If sheet metal is to be cut with the tool, for example, the tool is placed with its cutting angle at the edge of the sheet, the holder resting on the top of the sheet. The tool is guided by the parts of the holder on each side of the slit (*c*). The tool is driven forward by striking the holder. The cutting (*m*) which is removed by the blade (*d*) is thrown out at the top of the slit (*c*).

The tool will cut sheet metal of any length and breadth, or will make a slit in part of it. In this it differs from plate shearing machines, in which the dimensions of the sheet to be cut are limited by the body of the machine.

I claim:

1. The combination with a holder having a slit for the passage of a chip; of a stationary blade in said slit and projecting from the holder at an angle thereto, whereby the sheet is cut by being placed in said angle between the blade and holder and both co-operating to cut the sheet upon impact on the end of the holder.

2. The combination with a holder having a slit for the passage of a chip; of a stationary blade in said slit and projecting from the holder at an angle thereto, whereby the sheet is cut by being placed in said angle between the blade and holder and both co-operating to cut the sheet upon impact on the end of the holder, and means to adjust the angularity of the blade to the holder.

3. The combination with a holder having a slit for the passage of a chip; of a stationary blade in said slit having an arcuate cutting edge, said blade and edge projecting from said slit at an angle to the holder and said arcuate edge guiding and curling the chip removed by impact on the end of the holder.

4. The combination with a holder having a longitudinal slit vertically therethrough, and a bevelled face for engaging one side of the metal to be cut; of a stationary cutting blade mounted in said slit and projecting therefrom at an angle to said bevelled face and at the opposite side of the metal to be cut.

5. The combination with a holder having a longitudinal slit therethrough, and a bevelled face at one end for engaging one side of the metal to be cut; of a blade in said slit having a concave arcuate cutting edge, projecting from the slit to the opposite side of the sheet to be cut and means to adjust the angularity of the blade.

6. The combination with a holder bevelled at its forward end to form a sheet engaging face and having a longitudinal slit in a plane perpendicular to said face; of a stationary blade secured in said slit and projecting at its forward end below said face, said blade having a concave front edge presented toward the end of said slit adjacent said face and that portion of the front edge projecting below said face forming an acute angle.

7. The combination with a holder bevelled at its forward end to form a sheet engaging face and having a longitudinal slit in a plane substantially perpendicular to said face, and a shank at the opposite end of said holder, of a blade secured in the slit and having its forward end projecting from the slit at an acute angle to said face and means to adjust the angularity of the blade, said shank receiving and directing the cutting force of percussion substantially longitudinally of the holder.

In testimony that I claim the foregoing as my invention, I have signed my name.

PAUL WINTER.